Patented Sept. 3, 1935

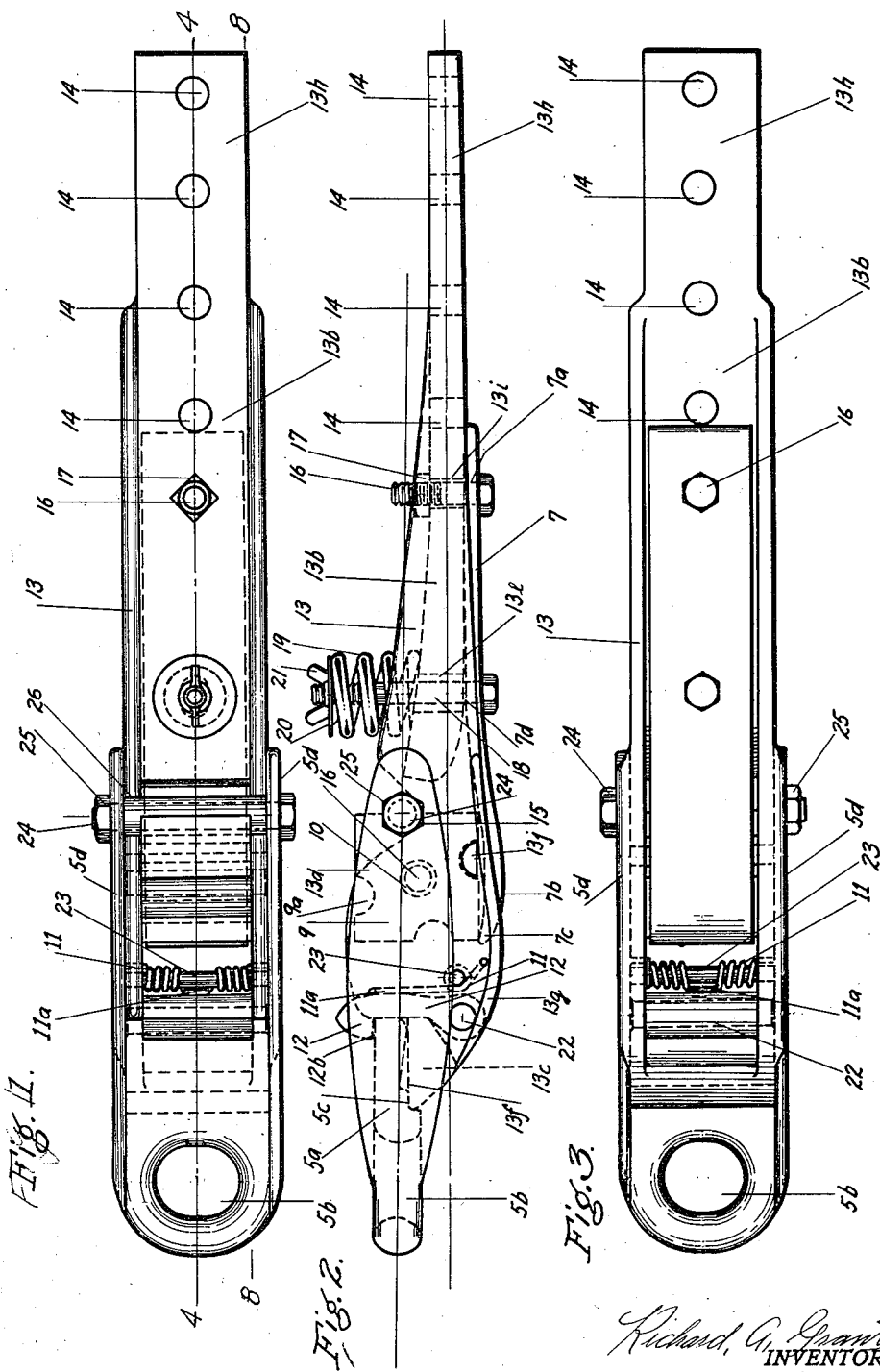

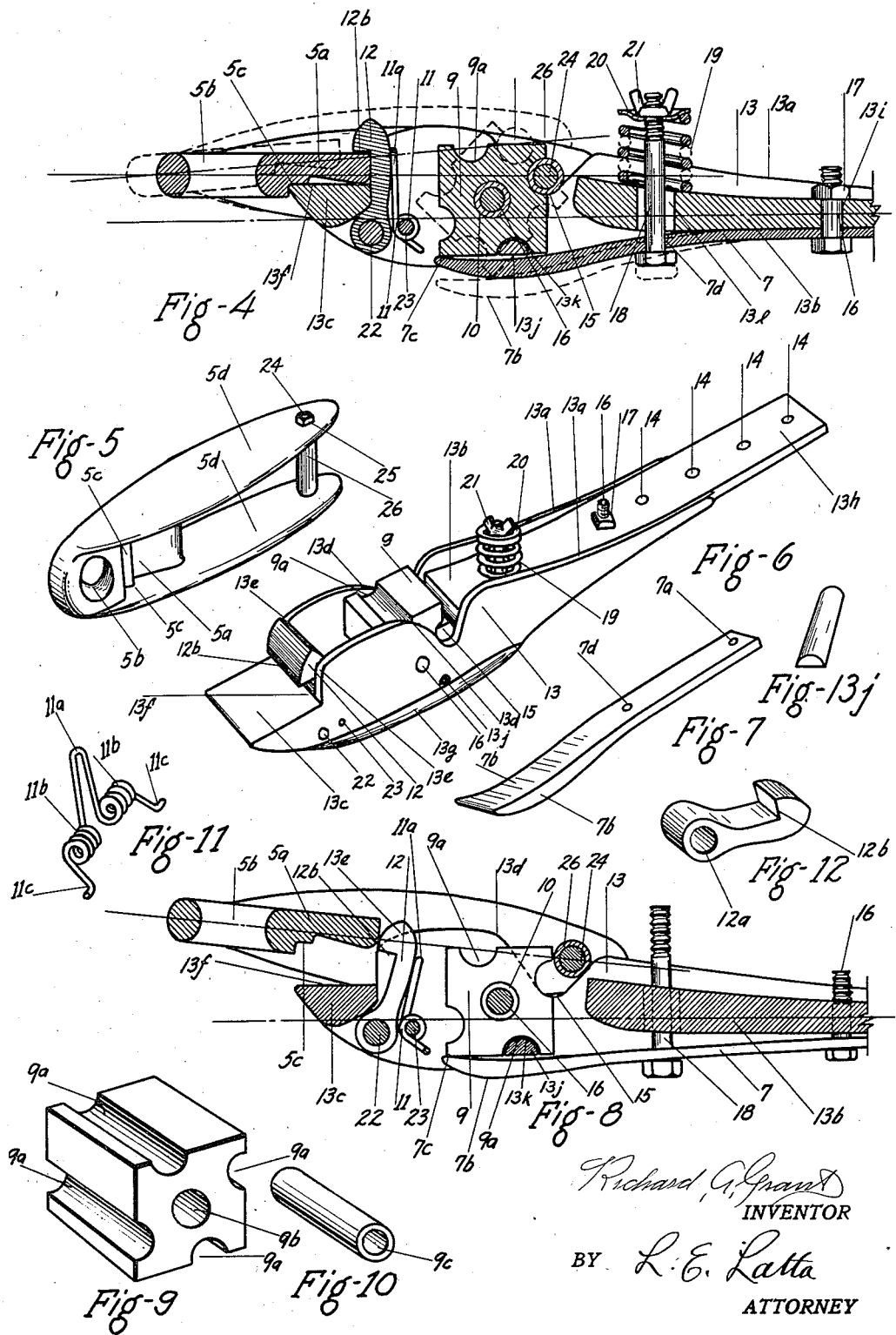

2,013,383

UNITED STATES PATENT OFFICE 2,013,383

DRAFT COUPLING DEVICE

Richard A. Grant, Jackson, Mich.

Application August 11, 1934, Serial No. 739,397

9 Claims. (Cl. 280—33.16)

A particular object of my invention is to provide a hitch and coupling member, the same to be an intermediary between a source of locomotion and a device to be moved by means outside of itself.

A further object is to provide such a device with means for automatically releasing the pulled device from the locomotor when the load or strain of the draft tends to rise above some predetermined degree, whereby damage or other undesired results may be effected.

An additional object of my invention is to provide new and improved means for variable adjustments of the releasing point of the engaged and engaging members of the coupler at any desired and predetermined amount of pulling stress or drag of the mechanisms.

A common illustration of these objects is supplied by the application of my invention as a coupler between a gasolene tractor and a plow. The releasing point of the device is adjusted for a desired stress or load, just safely above that required to pull the plowshare through the soil. Should the plowshare point strike a large, deeply embedded stone or other obstruction, the stress of the pull of the plow against the forward movement of the tractor would mount so greatly and abruptly as to break the plow point or other part or parts of the combined mechanisms. The automatic release is preadjusted at will of the operator so that it will release the plow from the tractor at an ample safety margin between the breaking stress of the machine parts, and that required to pull the plowshare through the soil.

Still another object is to provide a simple and easy means of locking the coupler, at the will of the operator, so that the same may be transformed into a non-releasing hitch.

An additional object is to provide such a device which is staunch, firm, secure and non-releasable in the often necessary backward or reverse movements of the coupled mechanisms, such as in backing the plow off of and away from the arresting obstruction, when the machines have been recoupled after release.

Other objects accomplished in my invention are simplicity of design and manipulation, and reduction in manufacturing cost. The design and structure of the coupler and its component parts are such that all functions of attachment, release, re-attachment and adjustments may be made in the field or upon the road by hand and without tools or appliances. Through simplicity of design and principles of operation, I have reduced to a minimum, and I believe altogether, the inefficiencies and faults in operations of similar devices which have proved susceptible to wear, clogging with weeds, grit, dried lubricants and the like so as to result in binding, holding and failure of the devices to release at critical times and occasions, resulting in breakage of machine parts and resultant expenses and loss of time.

While I have above referred to the application of my invention as embodied in a hitch and coupling device for use in connection with a tractor and a plow and like agricultural machines, I desire it to be understood that the invention may, and is intended to be embodied in devices applicable to many other fields of uses, and the claims I make herein are not intended to be restricted to the specific field above used for the purpose of illustration.

Other objects and advantages of the invention will be apparent during the course of the following description.

In the accompanying drawings, forming a part of this specification, and in which like numerals are employed to designate like parts throughout the same, Fig. 1 is a top plan view of the draft coupling device in which the clevis or engaged member is shown in engaged, operating relation with the frame assembly and engaging member, certain hidden parts being shown therein by dotted lines.

Fig. 2 is a side elevation view of the device, in which certain hidden parts are also shown by dotted lines.

Fig. 3 is a bottom plan view.

Fig. 4 is a vertical cross section, taken on line A—A of Fig. 1, the solid lines showing the clevis or engaged member being in normal, engaged, operating position, while dotted lines show the releasing position of the engaged member, substantially at the stage of releasement where it leaves the engaging member; dotted lines also showing the relative positions at this point of the rotating engaging member, the transverse seats thereof and the tension bar member.

Fig. 5 is a bottom perspective view of the clevis or engaged member, from its forward end.

Fig. 6 is a perspective view of the frame assembly portion of the coupling device, with clevis member detached.

Fig. 7 is a detailed view in perspective of the tension bar member.

Fig. 8 is a vertical cross section taken on line B—B of Fig. 1 in which are also shown in solid lines certain parts of the assembly in their relative positions, as the clevis member is being thrust into normal engagement with the engaging member.

Fig. 9 is a detailed view in perspective of the rotatable engaging member.

Fig. 10 is a detailed view in perspective of a bushing for member and sleeve 26 of Fig. 5 respectively, said elements being identical in form.

Fig. 11 is a detailed view in perspective of the torsional, trigger-block spring.

Fig. 12 is a detailed view in perspective of the trigger-block member.

Fig. 13j is a perspective view of a detachable key for fixedly locking member 9 against rotation.

Numeral 13 represents a rigid frame member, 13a—13a the respective irregularly shaped sides thereof, 13b the bottom of the frame which is disposed between the sides at an upward angle from their rearward ends forwardly, and 13c a vertical, transverse web disposed crosswise of the forward extremity of the frame so as to form a nose-like end thereof, the bottom being, for the sake of smoothness and efficiency of operation, sled-runner in shape. 13a, 13b and 13c and 13g are made integral with each other and together compose the rigid frame member.

The frame sides 13a—13a are convexedly rounded as at 13d—13d forming guiding contours to the edges, operating to throw the engaged or clevis member 5 upwards, away from and free of the frame member 13 when released from the engaging member 9 as will be more fully described later herein.

The rounded contours of the edges of the frame sides are carried forward and downward as at 13e—13e, to facilitate the easy engagement of the engaged clevis member 5 with the frame assembly as is shown in Figs. 1, 2, 3, 4, and 8 respectively.

A flat, shelflike seat, 13f, is formed at the forward end of the frame member, adapted to facilitate the rigid, secure and fixed engagement and coupling of the clevis member and the frame member while the movement of the coupled mechanisms is in the reverse direction, which will be more fully described later herein.

The frame sides 13a—13a are reenforced by longitudinal webs, 13g, disposed along the lower edges thereof, at the forward ends.

The bottom of the frame member 13b, is extended rearwardly beyond the ends of the frame-sides, 13a—13a, as at 13h, affording facilities for attaching the frame assembly to the attachment device of the drawbar of a drawn mechanism. Such attachment device is not claimed as a part of my invention and is therefore not shown.

14—14—14 and 14 are holes disposed in the frame bottom extension 13h, and may be of any greater or less number, as desired, these being for the engagement of the attachment device of the drawn mechanism.

A recessed seat 15 is cut in the upper edge of each frame-side 13a, adjacent to the convex contours 13d, alined with each other and so disposed as to be in alinement with the successive transverse seats of the engaging member 9, hereinafter more fully described, adapted to normally engage the crossbar or clevis pin of the clevis member 5.

9 is a cubically shaped, rotatable block member designated herein as the engaging member, pivotally mounted on pivot 16 and the bushing 10 thereupon, in the frame member 13 in alined apertures therefor.

Engaging member 9 has half-round, transverse seats 9a, 9a, 9a and 9a, cut into the respective faces thereof, at positions slightly above the center of rotation of the engaging member; the engaging member being bushed with bushing 10, and rotatably mounted on pivot 16 which is fixedly held in apertures at 16 in the frame member 13. Seats 9a of the engaging member 9 and seats 15 of the frame-sides 13a, are disposed so as to operate coordinately, that is to say; as engaging member 9 rotates, the respective seats 9a successively come into alinement with seats 15, and the seats 15 with the seat 9a presently alined therewith, releasably receive in engagement the crossbar or clevis pin of the engaged member 5 as will be more fully described later herein.

9b is a centrally disposed, transverse aperture in engaging member 9 to receive bushing 10, and 9c is a bearing for mounting member 9 upon pivot 16.

The tension bar 7 is a bar of spring steel, steel alloy or other suitable material, disposed longitudinally along the underside of the frame bottom 13b and is attached fixedly at its rearward end to the frame bottom by a bolt and nut 16 and 17 respectively, the bolt extending upwardly through aperture 7a in the bar 7 and a like aperture 13i alined therewith in the frame bottom. The bar 7 is enlarged at the forward end and is slightly concave in shape on the upward face and convexed on the lower face thereof, at the portion designated by 7b—7b. The forward end of the bar may be hardened by any desirable process therefor to guard against tendency to excessive wear under tensional engagement with member 9 and the friction caused by rotation of the latter.

The somewhat nose shaped forward end of bar 7 normally engages, under slight tension, the forward, lower edge of the rotatable engaging member 9 at a position designated by 7c in Figures 2, 4 and 8 respectively. It is to be noted that the engaging member 9 is normally so disposed that the longitudinal plane of its lower face is lower than that of the place of contact between bar 7 and the frame bottom 13b at aperture 13i. This, coupled with the fact that the frame bottom 13b is disposed at an angle with the lower edges of the frame sides 13a, and that the upper face of the bar 7 is concave in shape in the forward portion thereof, combines to result in the upper face of bar 7 being out of contact with the frame assembly between its points of engagement with the forward edge of the lower side of engaging member 9 and the frame bottom at 13i.

The relative disposition and relation of the parts as above described permit and facilitate the increasing and decreasing of the normal tension of spring bar 7 against the engaging member 9, as I will now more clearly describe. At 7d is an aperture in the bar 7 designed to receive a bolt and in frame bottom 13b is an aperture 13l disposed to aline therewith, the aperture 13l being ovate in shape. A bolt 18 headed at one end and threaded at the other end is thrust upward through apertures 7d and 13l in bar 7 and frame bottom 13b respectively, the headed end of the bolt engaging the lower side of the bar. Mounted upon the upper side of the frame bottom 13b and around the bolt 18 is a compression coil-spring 19, seating the upper end of which is a slidable washer 20, interposed upon bolt 18 intermediate the upper end of the spring 19 and a suitably threaded nut 21, adapted to be screwed downward and upward on said bolt. As nut 21 is screwed downward against washer 20, the spring 19 is compressed, acting to draw the head of bolt 18 upward against tension bar 7. There being nothing to obstruct and restrain the yielding of the tension bar to the tension, forwardly of the engaging bolt 16, the result is to increase the tension of the forward end of bar 7 upon the engaging member 9 at the place of contact therewith. The function of engaging member 9 is to rotate forwardly with the pull of the engaged member 5, but is restrained and retarded against its rotary movement by the tension bar 7. As the tension of spring 19 on bar 7 increases, so does the tension of bar 7 on engaging member 9 increase and the restraint and retardation of the movement of engaging member 9 is likewise increased. It is through the above described means of increasing or decreasing the tension of bar 7 against member 9 that the degree of restraint and retardation of the rotary movement of the latter member is adjusted so that the rotation of member 9 will occur only as and when the pull of the draft applied to engaged member 5 is sufficient to overcome the restraint against such movement set up by tension bar 7, as described. Thus the releasing positions of members 5 and 9 respectively are brought about by the application of any predetermined load strain applied in a forward direction to the engaged member 5.

Transversely mounted in suitable alined apertures 13k in frame-sides 13a is a removable key 13j, adapted to engage the recessed, transverse seat 9a in the lower face of engaging member 9 when the latter is in normal engaging position, as shown in Figs. 2, 4, 6 and 8 respectively. When key 13j is mounted in place, it wholly prevents any rotary movement whatsoever of the rotatable engaging member 9, and serves to transform the device into a fixed and non-releasing coupler.

5 is a U shaped clevis member which I also designate in this specification as the engaged member. Disposed transversely between the side-arms 5d—5d thereof is a horizontal web 5a, extending from the forward U shaped end, rearwardly. The aperture 5b therein is adapted to receive an engaging member of any drawing mechanism, the latter, not being a part of my invention, is not claimed or shown herein.

A seat 5c is cut into the lower side of web 5a, transversely thereof, and is adapted to receive the flat shelflike seat 13f of the forward end of the frame member 13, the forward frame end abutting the ledge of the seat and seating itself firmly against the same. The rearward end of web 5a is similarly seated against the shoulders of frame-sides 13a at and above the upper side, 13f, of frame-web 13c.

U shaped clevis member 5 and seat 5c of the web 5b therein, and the forward end of the frame member assembly are designed and so disposed that when said members are in coupled, operating relation with each other, the line of forward draft from the drawn mechanism through the engaged member 5 and the engaging member 9 is at a slightly forward upward angle with the longitudinal, horizontal plane of the center of the engaging member. This angle of the draft facilitates the rotation of member 9 and the smooth release of the engaged member 5, at opportune times and conditions.

A trigger-block, locking member 12, which will be more fully described later herein, is adapted to engage the upper side of the rearward portion of web 5a of the engaged member 5, and serves to lock the rearward end of said web in close, firm and rigid engagement with the upper face 13f of the forward shelflike end, and the shoulders of the sides of the frame member 13, as above described.

The trigger-block locking member 12 is pivotally mounted in the frame member 13 on a pivot 22, the ends of which are respectively received by suitable apertures therefor, disposed in alinement with each other in the frame-sides, as clearly shown in Figures 2, 3, 4, 6 and 8.

Pivot 22 may be fixedly or removably mounted in the apertures in the frame-sides in many ways, all of which are more or less conventionally used in such cases, but I prefer the method which is more clearly shown in Figure 3, in which the said apertures are countersunk at the outer openings thereof, and the ends of the pivot peaned over so as to fixedly retain the same in place.

Disposed in the lower end of locking member 12 is a transverse bearing 12a to receive the pivot 22 and at the upper end thereof being provided a dog or hooked end 12b, adapted to engage the upper side of the rearward end of web 5a of engaged member 5. This serves to hold web 5a in secure and fixed engagement with shelflike upper face 13f of frame 13, while the movement of the coupled mechanisms is in the reverse direction. The crown of the locking member 12 is rounded on both forward and rearward sides thereof. The rearward side being rounded to facilitate the free and unhindered forward travel of the transverse bar or clevis pin of engaged member 5, when, after release, the said bar is passing forwardly along the convex contour of frame-sides 13a. When the crossbar, after releasement, has traveled forward to the point of contact with the crown of member 12, the rounded top of the latter facilitates and induces the upward and free movement of the engaged member, and prevents its hanging up at this point or causing a jerking, jarring shock to the machines.

The rounded forward side of the crown of member 12 under the thrust of web 5a induces the member to swing backwardly on pivot 22 when the engaged member is thrust downward in the act of placing the latter in engagement with the frame assembly.

Figure 8 illustrates the engaged member 5 as it is in partial engagement with the frame assembly of the device. The crossbar or clevis pin of member 5 is just going into its normal, seated position in the recess 9a of engaging member 9. The rear end of web 5a has forced member 12 to swing backwards, so that the engaged member is now in position to pass downward to its full engaged position as shown in Figs. 2 and 3 respectively.

Pivotally mounted in the frame member, directly in the rear of member 12 is a torsional spring member 11. This spring has a hairpin shaped, vertical extension 11a, disposed midway of the member, and on either side of the vertical extension are lateral extensions 11b—11b disposed coilwise around and mounted upon a supporting pivot 23, the ends of which are received by suitably disposed apertures therefor in the frame-sides 13a. The respective extremities of spring 11 are turned outwardly at right angles and the ends 11c—11c are adapted to engage with suitable apertures to receive the same which are disposed in the frame-sides 13a to the rearward of member 12 and in coordinate position therewith.

The hairpin shaped extension 11a is disposed so that the upper end thereof torsionally engages the rearward face of member 12 and is adapted to return member 12 to and hold it in its normal engaging position on web 5a after the engaged member 5 has been placed in complete engagement with the frame member. The relative positions of members 5, 11 and 12 at different stages of their functioning, are indicated in Figs. 3, 4 and 8 respectively.

In the preferred embodiment of my invention, as herein shown, the side arms 5d—5d of the U shaped clevis member 5, near their respective extremities, are suitably apertured to receive a bolt 24, headed at one end and threaded at the other end to receive nut 25. A sleeve 26 is mounted transversely upon the bolt 24 between said side-arms, thus forming the crossbar or clevis pin member of the clevis 5. This crossbar may be designed and constructed in various other ways, e. g., by casting the same integrally with the side arms 5d. I prefer the means shown for the reason that in the event of breakage of the crossbar, the method as shown permits of repair and replacement at a minimum cost. The engaging surface of the sleeve 26 may also be changed by a partial turn of the sleeve upon the bolt 24, thus avoiding excessive wear at a particular portion of the surface of the sleeve.

All the various members of this device, with the exception of springs, bolts, nuts, pivots and washers, may be made of cast steel or such other suitable metals as may be found desirable by the manufacturer thereof. The other parts may be such as are in common use and to be obtained in the markets for such merchandise.

In a more general way, the practical operations of the device are substantially as follows:

The engaged member 5 is attached to the drawbar of the drawing mechanism, and the frame assembly member is attached to the drawbar or tongue of the drawn mechanism. The mechanisms being brought into coupling positions, the engaged member 5 of the device is coupled to the frame member 13 by seating the crossbar or clevis pin in the transverse seat 9a of engaging member 9. The forward end of the engaged member is thrust downward until it firmly seats itself on the forward end of the frame member and locking member 12 snaps back into its normal locking position. This completes the coupling of the mechanisms.

When the machines, such as a farm tractor and a plow are put into work, the tension of bar 7 is adjusted to a degree that will prevent rotation of engaging member 9 until the draft has increased well above that required to pull the plow in the ordinary process of its work. When, however, the plow strikes an unusual obstruction in or upon the ground so that the pulling stress on engaged member 5 mounts suddenly and abnormally higher, the strain on the engaging member 9 overcomes the resistance against its rotation, at a point safely below that required to break machine parts of the mechanisms. The rotating member starts to rotate forwardly until the clevis pin passes forwardly and upwardly along the upper edges of the frame sides 13a to the position where it passes completely out of engagement and free of the frame member. The mechanisms are thereupon uncoupled and all draft, stress and strain is for the moment relieved. The drawing mechanism is put in reverse movement to bring the mechanisms again into coupling position. The engaged and engaging members of the device are again coupled together and the tractor resumes its reverse movement. Its reverse, pushing force is applied to the coupler at the rear wall of aperture 5b and thence to the forward end and shoulders of the frame member and finally to the engaging member of the drawn mechanism or plow at its place of engagement with the extension of the frame bottom of the device 13h. Thus the plow is backed off and away from the obstruction and is ready to proceed in the work.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A draft coupling device of the character described, comprising a rigid frame member, a rotatable engaging member pivotally mounted therein, a rigid engaged member normally coupled therewith and adapted to be uncoupled and released therefrom by the rotation of the engaging member, combined tensional and leverage means for, in a governable degree, yieldingly holding and retarding the engaging member against rotation, means for tensional adjustment and limiting the degree of restraint and retardation of the movement of the engaging member to that induced by any predetermined load strain, and means for fixedly holding in rigid, secure engagement the engaged member and the engaging member while the movement of the coupled mechanisms is in the reverse direction.

2. A draft coupling device of the character described, comprising a rigid frame member, a cubically shaped, rotatable, engaging member pivotally mounted in the frame member, having recessed into each of certain of the successive faces thereof respectively at suitably placed positions thereon, slightly above the center of rotation of the engaging member, transversely disposed seats, some one of which being normally in engaging position at all times; a rigid engaged member, adapted to normally engage with the engaging member in the recessed seat thereof which is then in engaging position, releasable therefrom by the rotation of the pivoted engaging member, said rotary movement of the engaging member being adapted to automatically reset the engaging member so that the succeeding transverse seat thereof, after release of the engaged member, is in re-engaging position; combined tensional and leverage means for, in a governable degree, yieldingly holding and retarding the engaging member against rotation, means for tensional adjustment and limiting of the degree of restraint and retardation of the movement of the engaging member to that induced by any predetermined load strain; and means for fixedly holding in rigid and secure engagement the engaged and engaging members while the movement of the coupled mechanisms is in the reverse direction.

3. A draft coupling device of the character described, comprising a rigid frame member, a cubically shaped, rotatable, engaging member pivotally mounted in the frame member, having recessed into each of certain of the successive faces thereof respectively at suitably placed positions thereon, slightly above the center of rotation of the engaging member, transversely disposed seats, some one of which being normally in engaging position at all times; a rigid engaged member, adapted to normally engage with the engaging member in the recessed seat thereof which is then in engaging position, releasable therefrom by the rotation of the pivoted engaging member, said rotary movement of the engaging member being adapted to automatically reset the engaging member so that the succeeding transverse seat thereof, after release of the engaged member, is in re-engaging position; combined tensional and leverage means for, in a governable degree, yieldingly holding and retarding the engaging member against rotation, means for tensional adjustment and limiting of the degree of restraint and retardation of the movement of the engaging member to that induced by any predetermined load strain; means for fixedly holding in rigid and secure engagement the engaged and engaging members while the movement of the coupled mechanisms is in the reverse direction; and the frame member sides each having a suitable aperture therein, disposed in alinement with each other and with the recessed seat in the lower side of the engaging member when the latter is in normal engaging position, a key member detachably mountable in the said apertures, and when so mounted, adapted to engage the engaging member in the alined recessed seat therein and hold the engaging member fixedly against rotation.

4. A draft coupling device of the character described, comprising a rigid frame member, a cubically shaped, rotatable, engaging member pivotally mounted in the frame member, having recessed into each of certain of the successive faces thereof respectively, at suitably placed positions thereon, slightly above the center of rotation of the engaging member, transversely disposed seats, some one of which being normally in engaging position at all times; a rigid engaged member adapted to normally engage with the engaging member in the recessed seat thereof which is then in engaging position, releasable therefrom by the rotation of the pivoted engaging member, said rotary movement of the engaging member being adapted to automatically reset the engaging member so that the succeeding transverse seat recess thereof, after release of the engaged member, is in re-engaging position; a spring tension bar member slightly concave on its upward side, the forward end thereof being enlarged and nose shaped, having an aperture therein near the rearward end thereof to receive a bolt, the bottom of the frame member having suitably disposed therein a like aperture, a bolt headed at one end and threaded at the other end to receive a nut, a suitable, threaded nut therefor, adapted to securely and fixedly attach the bar at its rearward end to the bottom of the frame member, the forward nose shaped end of the bar adapted to tensionally engage the forward edge of the lower side of the engaging member and yieldingly hold and retard the engaging member against rotation; leverage means for overcoming the resistance against rotary movement of the engaging member; means for adjustment of tension of the bar against the engaging member and limiting the degree of restraint and retardation of the movement of the engaging member to that induced by any predetermined load strain; and means for fixedly holding in rigid and secure engagement the engaged and the engaging members while the movement of the coupled mechanisms is in the reverse direction.

5. A draft coupling device of the character described, comprising a rigid frame member, a cubically shaped, rotatable, engaging member pivotally mounted in the frame member, having recessed into each of certain of the successive faces thereof respectively, at suitably placed positions thereon, slightly above the center of rotation of the engaging member, transversely disposed seats, some one of which being normally in engaging position at all times; a rigid engaged member adapted to normally engage with the engaging member in the recessed seat thereof which is then in engaging position, releasable therefrom by the rotation of the pivoted engaging member, said rotary movement of the engaging member being adapted to automatically reset the engaging member so that the succeeding transverse seat recess thereof, after release of the engaged member, is in re-engaging position; fixedly attached to the bottom of the frame member a spring tension bar, having its forward end enlarged and nose shaped, adapted to tensionally engage the forward edge of the lower side of the engaging member, the bar having suitably placed therein, near the rearward end thereof an aperture to receive a bolt, the bottom of the frame member having suitably disposed therein a like coordinate aperture, said apertures being in alinement with each other, a bolt headed at one end and threaded at the other end, a suitably threaded nut therefor, a washer slidably mounted on said bolt, the bolt being mounted upon the bar and frame bottom, through said apertures, a coil tension spring mounted upon and around the bolt, seated at the lower end against the upper side of the frame bottom and at the upper end against the washer, the latter being interposed intermediate the spring and nut, the downward and upward movements of the nut upon the bolt adapted to variably increase and diminish the tension of the bar upon the engaging member and the degree of restraint and retardation of the latter's movement; and means for fixedly holding in rigid and secure engagement the engaged and engaging members while the movement of the coupled mechanisms is in the reverse direction.

6. A draft coupling device of the character described, comprising a rigid frame member, a cubically shaped, rotatable, engaging member pivotally mounted in the frame member, having recessed into each of certain of the successive faces thereof respectively, at suitably placed positions thereon slightly above the center of rotation of the engaging member, transversely disposed seats, some one of which being normally in engaging position at all times, a rigid engaged member adapted to normally engage with the engaging member in the recessed seat thereof which is then in engaging position, releasable therefrom by the rotation of the pivoted engaging member, said rotary movement of the engaging member being adapted to automatically reset the engaging member so that the succeeding transverse seat recess thereof, after release of the engaged member, is in re-engaging position; fixedly attached to the bottom of the frame member a spring tension bar, having its forward end enlarged and nose shaped, adapted to tensionally engage the forward edge of the lower side of the engaging member, the bar having suitably placed therein, near the rearward end thereof an aperture to receive a bolt, the bottom of the frame member having suitably disposed therein a like coordinate aperture, said apertures being in alinement with each other, a bolt headed at one end and threaded at the other end, a suitably threaded nut therefor, a washer slidably mounted on said bolt, the bolt being mounted upon the bar and frame bottom, through said apertures, a coil tension spring mounted upon and around the bolt, seated at the lower end against the upper side of the frame bottom and at the upper end against the washer, the latter being interposed intermediate the spring and nut, the downward and upward movements of the nut upon the bolt adapted to variably increase and diminish the tension of the bar upon the engaging member and the degree of restraint and retardation of the latter's movement; and a trigger-block member having the crown thereof rounded and hook shaped, pivotally mounted in the frame member intermediate the engaging member and the vertical, transverse web of the frame member, adapted for the hooked end thereof to firmly contact the engaged member, a torsion spring member having midway thereof a hair pin shaped loop extension torsionally engaging the rearward face of the trigger-block, a supporting pivot member, the respective lateral extensions of the spring being disposed coilwise around and mounted upon the supporting pivot which is mounted in alined apertures therefore suitably placed in the frame member sides rearwardly of the mountings of the trigger-block member, the extremities of the spring being fixedly mounted in the frame sides in coordinating relation with the pivot, adapted to hold said trigger-block member in engagement with the engaged member while the movement of the coupled mechanisms is in the reverse direction.

7. A draft coupling device of the character described, comprising a rigid clevis member having alined apertures in the respective extremities of the arms, alined with said apertures and fixedly mounted therein a crossbar, and having in the curved end of the clevis an aperture adapted to engage the attachment device of the drawbar of a power supplying mechanism designed to be coupled with such clevis member; a rigid frame member having two sides and bottom integral with each other, the latter being disposed between the sides at a slightly upward angle from the rear forwardly and extended at the rearward end thereof beyond the side ends, means for attaching the same to the drawbar of a drawn mechanism; the frame member being provided with reenforcing flanges integral therewith, disposed along the lower edges of the frame-sides, adjacent the forward ends thereof, said frame-sides having their upper edges at the forward ends thereof convexedly curved upwards, having suitable seats recessed in each side of the frame member in alinement, adapted to engage the crossbar of the clevis member; a vertical, transverse web disposed between the frame sides towards their forward ends and integral therewith; pivotally mounted in said frame member a rotatable, cubically shaped engaging member having recessed into each of certain of the successive faces thereof respectively, at suitably placed positions thereon, slightly above the center of rotation of the engaging member, transversely disposed seats, the respective seats being successively brought into alinement with the recessed seats of the frame member by the rotating of the engaging member, adapted to normally engage the crossbar of the clevis member and to release the same by the rotation of the engaging member when same is induced by a draft applied to the clevis member, said rotary movement being operative to automatically reset the engaging member so that the succeeding transverse seat recess thereof, after release of the clevis member, is in re-engaging position; combined tensional and leverage means for, in a governable degree, yieldingly holding the engaging member against rotary movement; means for adjusting and limiting the degree of restraint applied against the movement of the engaging member, at any predetermined load strain; a trigger-block member having the crown thereof rounded and hook shaped, pivotally mounted in the frame member, adapted for the hooked end to engage the clevis member; and means for normally holding the said trigger-block member in engagement with the clevis member while the movement of the coupled mechanisms is in a reverse direction.

8. A draft coupling device of the character described, comprising a rigid U shaped clevis member having a horizontal, transversely disposed web across the U shaped end thereof, into the lower side whereof is recessed two transversely disposed seats, one above and rearward of the other and adapted to supportably receive the forward webbed end of a frame member; having disposed in said U shaped end an aperture adapted for engaging the attachment device of the drawbar of a power supplying mechanism, the respective extremities of the arms having apertures therein alined with each other and in alinement therewith and fixedly mounted therein a crossbar; a rigid frame member having two sides and bottom integral with each other, the latter being disposed between the sides at a slightly upward angle from the rear forwardly and extended at the rearward end thereof beyond the side ends, means for attaching the same to the drawbar of a drawn mechanism; the frame member being provided with reenforcing flanges integral therewith, disposed along the lower edges of the frame-sides, adjacent the forward ends thereof, said frame-sides having their upper edges at the forward ends thereof convexedly curved upwards, having a suitable seat recessed into each side of the frame member in alinement with each other, adapted to engage the crossbar of the clevis member; a vertical, transverse web disposed between the frame sides toward their forward ends and integral therewith; pivotally mounted in said frame member a rotatable, cubically shaped engaging member having recessed into each of certain of the successive faces thereof respectively at suitably placed positions thereon, slightly above the center of rotation of the engaging member, transversely disposed seats, the respective seats being successively brought into alinement with the recessed seats of the frame member by the rotating of the engaging member when the same is induced by a draft applied to the clevis member, said rotary movement being operative to automatically reset the engaging member so that the successively transverse seat thereof, after release of the clevis member, is in re-engaging position; a spring tension bar member disposed beneath the frame member and longitudinally thereof, being slightly concave on the upward side and the forward end thereof being enlarged and nose shaped, having an aperture therein near the rearward end thereof to receive a bolt, the bottom of the frame member having suitably disposed therein a like coordinate aperture, a bolt headed at one end and threaded at the other end to receive a nut, a suitable threaded nut therefor, adapted to securely and fixedly attach the bar at its rearward end to the bottom of the frame member, the said bar, forwardly of the place of attachment to the bottom of the frame, being slightly out of contact with the frame, the forward nose shaped end of the bar adapted to tensionally engage the forward edge of the lower side of the engaging member and yieldingly hold and retard the engaging member against rotary movement; leverage means for overcoming the resistance against rotary movement of the engaging member; the tension bar member having suitably placed therein another aperture in alinement with a like coordinate aperture, the same being suitably disposed in the bottom of the frame member; a bolt headed at one end and threaded at the other end, a suitable threaded nut therefor, a washer slidably mounted on said bolt, the bolt being mounted upon the bar and frame bottom, through said apertures, a coil tension spring mounted upon and around said bolt, seated thereupon at the lower end against the upper side of the frame bottom and at the upper end against the washer, the latter being interposed intermediate the spring and the nut, the downward and upward movements of the nut upon the bolt adapted to variably increase and diminish the tension of the bar upon the engaging member and the degree of restraint and retardation of the movement of the engaging member; a trigger-block member having the crown thereof rounded and hook shaped, pivotally mounted in the frame member, intermediate the engaging member and the vertical, transverse web of the frame member, adapted for the hooked end of the trigger-block to engage the transverse web of the clevis member; and torsion spring member, having midway thereof, a hairpin shaped loop extension, torsionally engaging the rearward face of the trigger-block member, having a supporting pivot, the respective lateral extensions of the spring being disposed coilwise around and mounted upon the said pivot, which is in turn mounted in alined apertures therefor, suitably placed in the frame member sides rearwardly of the mountings of the trigger-block member, the extremities of the spring being fixedly mounted in the frame sides in coordinating relation with the pivot, said trigger-block member normally being in engagement with the clevis member, adapted to hold the engaging member and the engaged, clevis member securely and rigidly coupled while the movement of the coupled mechanisms is in a reverse direction.

9. A draft coupling device of the character described, comprising a rigid U shaped clevis member having a horizontal, transversely disposed web across the U shaped end thereof, into the lower side whereof is recessed two transversely disposed seats, one above and rearward of the other and adapted to supportably receive the forward webbed end of a frame member; having disposed in said U-shaped end an aperture adapted for engaging the attachment device of the drawbar of a power supplying mechanism, the respective extremities of the arms having apertures therein alined with each other and in alinement therewith and fixedly mounted therein a crossbar; a rigid frame member having two sides and bottom integral with each other, the latter being disposed between the sides at a slightly upward angle from the rear forwardly and extended at the rearward end thereof beyond the side ends, means for attaching the same to the drawbar of a drawn mechanism; the frame member being provided with reenforcing flanges integral therewith, disposed along the lower edges of the frame-sides, adjacent the forward ends thereof, said frame-sides having their upper edges at the forward ends thereof convexedly curved upwards, having a suitable seat recessed into each side of the frame member in alinement with each other, adapted to engage the crossbar of the clevis member; a vertical, transverse web disposed between the frame sides toward their forward ends and integral therewith; having pivotally mounted in said frame member a rotatable, cubically shaped engaging member having recessed into each of certain of the successive faces thereof respectively at suitably placed positions thereon, slightly above the center of rotation of the engaging member, transversely disposed seats, the respective seats being successively brought into alinement with the recessed seats of the frame member by the rotating of the engaging member, adapted to normally engage the crossbar of the clevis member and to release the same by the rotation of the engaging member when the same is induced by a draft applied to the clevis member, said rotary movement being operative to automatically reset the engaging member so that the successively transverse seat thereof, after release of the clevis member, is in re-engaging position; a spring tension bar member disposed beneath the frame member and longitudinally thereof, being slightly concave on the upward side and the forward end thereof being enlarged and nose shaped, having an aperture therein near the rearward end thereof to receive a bolt, the bottom of the frame member having suitably disposed therein a like coordinate aperture, a bolt headed at one end and threaded at the other end to receive a nut, a suitable threaded nut therefor, adapted to securely and fixedly attach the bar at its rearward end to the bottom of the frame member, the said bar, forwardly of the place of attachment to the bottom of the frame, being slightly out of contact with the frame, the forward nose shaped end of the bar adapted to tensionally engage the forward edge of the lower side of the engaging member and yieldingly hold and retard the engaging member against rotary movement; leverage means for overcoming the resistance against rotary movement of the engaging member; the tension bar member having suitably placed therein another aperture in alinement with a like coordinate aperture, the same being suitably disposed in the bottom of the frame member; a bolt headed at one end and threaded at the other end, a suitable threaded nut therefor, a washer slidably mounted on said bolt, the bolt being mounted upon the bar and frame bottom, through said apertures, a coil tension spring mounted upon and around said bolt, seated thereupon at the lower end against the upper side of the frame bottom and at the upper end against the washer, the latter being interposed intermediate the spring and the nut, the downward and upward movements of the nut upon the bolt adapted to variably increase and diminish the tension of the bar upon the engaging member and the degree of restraint and retardation of the movement of the engaging member; a trigger-block member having the crown thereof rounded and hook shaped, pivotally mounted in the frame member, intermediate the engaging member and the vertical, transverse web of the frame member, adapted for the hooked end of the trigger-block to engage the transverse web of the clevis member; a torsion spring member, having midway thereof, a hairpin shaped loop extension, torsionally engaging the rearward face of the trigger-block member, having a supporting pivot, the respective lateral extensions of the spring being disposed coilwise around and mounted upon the said pivot, which is in turn mounted in alined apertures therefor, suitably placed in the frame member sides rearwardly of the mountings of the trigger-block member, the extremities of the spring being fixedly mounted in the frame sides in coordinating relation with the pivot, said trigger-block member normally being in engagement with the clevis member, adapted to hold the engaging member and the engaged, clevis member securely and rigidly coupled while the movement of the coupled mechanisms is in a reverse direction; and the frame member sides each having a suitable aperture therein, disposed in alinement with each other and the recessed seat in the lower side of the engaging member when the latter is in normal engaging position, a key member detachably mountable in the said apertures, and when so mounted, adapted to engage the engaging member in the alined recessed seat therein and hold the engaging member fixedly against rotation.

RICHARD A. GRANT.